Patented Feb. 27, 1951

2,543,191

UNITED STATES PATENT OFFICE 2,543,191

MANUFACTURE OF ORGANIC ESTERS OF CELLULOSE

John Francis Neilson and John Arthur Hawkes, Spondon, near Derby, England, assignors to Celanese Corporation of America, a corporation of Delaware No Drawing. Application October 15, 1948, Serial No. 54,818. In Great Britain October 31, 1947

6 Claims. (Cl. 260—227)

This invention relates to the manufacture of lower aliphatic esters of cellulose, especially cellulose acetate.

Cellulose acetate is usually made by reaction between cellulose and acetic anhydride using sulphuric acid as catalyst, the reaction being carried out in glacial acetic acid which dissolves the cellulose acetate as it is formed. The proportion of sulphuric acid present is about 9% to 20%, and more usually about 14% to 20%, of the dry weight of the celllulose. The first product of the reaction approximates in composition to a cellulose triacetate, i. e. a cellulose acetate having three acetyl groups for each glucose residue. This compound, however, is not soluble in acetone and, for this and other reasons, it is for most purposes partially hydrolyzed or "ripened" while still in solution in the acetic acid until its acetyl content (calculated as acetic acid) has fallen for example to about 54% to 56%. The cellulose acetate is now soluble in acetone and is precipitated from the solution by adding a large quantity of water or dilute acetic acid, after which it is washed and dried.

For certain purposes a higher acetyl content than this is desired, for example about 57% or 58%, but if the ripening is stopped at an earlier stage, it is frequently found that the product while having the desired relatively high acetyl value will not dissolve in acetone to give a clear solution. In practice this is a great disadvantage and considerably reduces its value and utility.

It is one object of the present invention to provide a process for making cellulose esters of relatively high acyl value, and in particular cellulose acetate of relatively high acetyl value, e. g. about 57–58.5%, which shall be capable of giving a clear solution in acetone. The invention is, however, also applicable with advantage to the production of cellulose triesters such as cellulose triacetate and of cellulose esters of acyl content below 57% (reckoned as acetic acid).

In accordance with the invention cellulose is esterified by means of a lower aliphatic acid anhydride in the presence of a solvent for the cellulose ester formed, using as catalyst less than 10% and preferably less than 6% of sulphuric acid and a small proportion, preferably below 2%, of perchloric acid. (The proportions of sulphuric and perchloric acids are expressed in percentages of the dry weight of the cellulose starting material.) As the solvent for the cellulose ester there may with advantage be used the acid corresponding to the anhydride, i. e. the esterifying acid, or if desired this may be partly or wholly replaced by another solvent, for example methylene chloride. Preferably the proportion of sulphuric acid employed is about 0.8% to 6%. The proportion of perchloric acid may with advantage be between about 0.2% and 1.5%, especially about 0.5–1%.

As the starting material there may, for example, be used cotton, cotton linters, or a purified wood pulp having an alpha-cellulose content preferably above about 90% and especially about 93% to 98% of the dry weight of the pulp: pulps of somewhat lower alpha-cellulose content can however be used if desired. The cellulose, in whatever form it is employed, is preferably given a pretreatment with an organic acid before the actual esterification. Thus in the manufacture of cellulose acetate the cellulose may with advantage be pretreated at about room temperature with acetic acid, for example in amount roughly equal to the dry weight of the cellulose. Such a pretreatment is a well-known expedient, and it is usual to have present also a small proportion, e. g. about 1% of the weight of the cellulose, of the sulphuric acid to be used as catalyst. For the purposes of the present invention, however, it is preferred to carry out the pretreatment in the absence of sulphuric acid but in the presence of perchloric acid; thus either the total amount of perchloric acid to be preesnt during the acetylation or less than this amount may be added to the acetic acid used in the pretreatment. Alternatively the pretreatment may be carried out without using a mineral acid, especially if some formic acid, e. g. 10–30 parts for each 100 parts of acetic acid, be present.

The pretreated cellulose, which will in general have absorbed substantially the whole of the pretreatment liquor, may then be transferred to the vessel in which the esterification is to be carried out. This may already contain the esterification mixture of acid anhydride, further organic acid and/or other solvent, and the catalyst (apart from catalyst already present in the pretreated cellulose), or the cellulose may be transferred to the vessel and the esterification mixture then added. In making cellulose acetate, for example, the pretreated cellulose may be added to an acetylation mixture comprising acetic anhydride, glacial acetic acid and sulphuric acid and also (unless it has all been added in the pretreatment) perchloric acid. For instance for each 100 parts of cellulose initially used the acetylation mixture may comprise 300 to 1000 parts of acetic acid and 200 to 400 parts of acetic anhydride.

A considerable amount of heat is evolved in the acetylation reaction, causing the temperature of the mixture to rise. It is in most cases preferable to restrict the temperature of the mixture to a maximum of about 40°–50° C., since higher temperatures cause a considerable reduction in the viscosity of the product; this may, for example, be done by circulating a cooling fluid, e. g. chilled brine, through a jacket or cooling coil round or within the acetylator, but it is usually sufficient and more convenient simply to pre-cool the acetylation mixture, e. g. to about —5° to 5° C., before bringing it into contact with the cellulose. If desired both pre-cooling and cooling during the reaction may be employed.

When the esterification is substantially complete the cellulose ester may be hydrolysed or "ripened." Preferably this is done while the cellulose ester is still in the esterification solution. Sufficient water, preferably in the form of an aqueous solution of the esterifying acid, is added to destroy any remaining acid anhydride and to provide for the requisite hydrolysis, and the mixture is then allowed to stand or is stirred or otherwise agitated until the desired amount of ripening has been accomplished.

The ripening may be carried out at about room temperature or at a higher temperature. If cellulose acetate is to be ripened at a temperature below about 50° C. it is advantageous to have present about 4% to 6% of sulphuric acid or even more (based on the dry weight of the initial cellulose) to act as catalyst, and if the proportion used as catalyst for the actual acetylation is less than this, further sulphuric acid should be added before or soon after the beginning of the ripening step so as to bring it up to the figure required. If ripening is carried out at higher temperatures, e. g. temperatures about 65–100° C. or higher, the proportion of sulphuric acid required is smaller; for example at 65–80° C. about 2% is adequate, while at higher temperatures still less may be used if desired. If the amount of sulphuric acid to be employed during the ripening is less than that used in the acetylation part of the latter may be neutralized, for example by means of magnesium acetate or some other suitable agent. Methods of ripening involving neutralizing part of the esterification catalyst, which may be employed in the present process, are described for example in U. S. Patents Nos. 2,373,786, 2,329,706 2,329,705, 2,427,403, 2,432,153 and U. S. application No. 633,268 filed December 6, 1945.

Although the catalytic effect of perchloric acid on the ripening is considerably less than that of sulphuric acid, it is possible to employ rather less sulphuric acid than the figures given above if the amount of perchloric acid is increased. For example when ripening at or below about 50° C., instead of having present during the ripening about 4–6% of sulphuric acid and about 0.5–1% of perchloric acid, there may be used about 2% of sulphuric acid and about 3% of perchloric acid. Thus if the acetylation is carried out using about 2% of sulphuric acid and 1% of perchloric acid, a further 2% of perchloric acid, and no sulphuric acid, may be added before ripening. Generally speaking however, it is preferred to ripen at a temperature between about 65 and 85 or 100° C. using the catalysts employed for the acetylation, if necessary after partial neutralization.

When the ripening has proceeded to the desired degree the cellulose ester may be precipitated, for example by means of water or a dilute aqueous organic acid. For instance dilute aqueous acetic acid may be stirred into a ripened solution of cellulose acetate. The precipitated cellulose ester may then be washed and dried in a conventional manner.

The invention can also be applied with advantage to the production of cellulose esters of higher acyl content, e. g. cellulose acetate which is insoluble in acetone but soluble, for example, in a mixture of methylene chloride and alcohol. Such cellulose acetates may have acetyl contents in excess of 60%, e. g. about 61–62.5%, and are conveniently referred to as triacetates, even though the acetyl value may be somewhat lower than that of a true triacetate, i. e. 62.5%.

Cellulose triacetates can of course be obtained by the usual known methods of acetylation if the ripening step is omitted or greatly shortened. It is found, however, that, owing to the elimination or shortening of the ripening operation, the cellulose triacetates so obtained have a high content of combined sulphuric acid and a correspondingly poor heat stability. It is a surprising advantage of the present invention that not only acetone-soluble cellulose acetates but also cellulose triacetates of good heat stability and relatively low combined sulphuric acid content, and at the same time of high viscosity, can be obtained.

The method adopted for making cellulose triacetate in accordance with the invention may be the same as has been described for making acetone-soluble cellulose acetate, as far as the destruction of the unchanged acetic anhydride at the end of the acetylation, though it is usually preferable to use as catalyst about 0.8 to 2%, e. g. about 1%, of sulphuric acid with about 0.8–1% of perchloric acid. It is advisable to effect a certain small degree of ripening, preferably without reducing the acetyl value below about 61%; this may be carried out under conditions similar to those already described, but for a much shorter time. For example, at a ripening temperature of 50° C., a ripening period between about 1 and 10 hours will generally give a product of the desired acetyl value having a very satisfactorily low content of combined sulphuric acid; the greater the degree of ripening, the lower within limits is the combined sulphuric acid content, but a product of good heat stability may be obtained even after a ripening period as short as one hour at 50° C.

Cellulose esters made by the processes described above do not generally speaking require any separate stabilization treatment. They may however be given a treatment to reduce the colour of moulded articles subsequently formed therefrom; a useful treatment for this purpose consists of a boil with water containing an oxide, hydroxide or carbonate of magnesium or an alkaline earth metal, e. g. calcium carbonate, barium hydroxide or magnesium oxide, followed by a few, e. g. 3 or 4, washes with hot distilled or demineralized water.

Although the invention has been described with particular reference to the production of cellulose acetate, it is also applicable to the production of other lower aliphatic acid esters of cellulose, for example cellulose propionate, butyrate, acetate-propionate and acetate-butyrate.

The invention is illustrated by the following examples. All the "parts" given are parts by weight.

*Example 1*

100 parts of cotton were pretreated at room temperature with 100 parts of acetic acid and 0.5 part of perchloric acid. The pretreated cotton was then added to a mixture, which had been cooled to 0° C., of 500 parts of acetic acid, 300 parts of acetic anhydride and 5 parts of sulphuric acid. The acetylation was complete after about an hour, the temperature rising to a maximum of 45° C. The mixture was then cooled to about 25° C. and 5 parts of 50% aqueous acetic acid added to destroy unchanged acetic anhydride. 100 parts of 50% aqueous acetic acid was then added and the charge was ripened for 22 hours at a temperature of 45° C., after which the cellulose acetate was precipitated, washed neutral and dried in hot air. The cellulose acetate so obtained had an acetyl value of 57.0% and dissolved in anhydrous acetone to give a good clear solution of 20% concentration. Its combined sulphuric acid (sulphate) content was 0.025%.

The procedure could be modified without greatly affecting the properties of the cellulose acetate produced by incorporating only 1 part of sulphuric acid in the acetylation mixture. Further sulphuric acid was then added before ripening, which was carried out either at about 45° C. in the presence of a total of 5 parts of sulphuric acid, or at about 85° C. in the presence of 2 parts of sulphuric acid.

*Example 2*

100 parts of cotton were pretreated at room temperature for 2 hours with 100 parts of acetic acid and 0.5 part of perchloric acid, and the pretreated cotton was then added with stirring to an acetylation mixture, cooled to 0° C., consisting of 600 parts of acetic acid, 300 parts of acetic anhydride and 5 parts of sulphuric acid. The acetylation was substantially complete within about 2 hours, the peak temperature being 40° C. Unchanged acetic anhydride was then destroyed by the addition of 50% aqueous acetic acid, and then 100 parts of 50% aqueous acetic acid was added to provide the water for the subsequent ripening, which was carried out for 91 hours at a temperature of 28° C. The product had an acetyl value of 58.5%, and a sulphate content 0.020%, and gave a good clear solution in anhydrous acetone.

*Example 3*

100 parts of cotton were pretreated at room temperature for 1 hour with 50 parts of acetic acid and 0.25 part of perchloric acid. The pretreated cotton was then added to a mixture, cooled to 5° C., of 240 parts of acetic anhydride, 760 parts of acetic acid, 0.25 part of perchloric acid and 1 part of sulphuric acid. The acetylation required about 1½ hours, the peak temperature being 43° C. Excess acetic anhydride was then destroyed by means of 50% aqueous acetic acid, and then a further 100 parts of the same aqueous acetic acid was added. The solution was allowed to ripen for 2 hours at 50° C. The product was a cellulose "triacetate" of acetyl value 61.1% with a sulphate content of 0.038%. By extending the ripening time to about 5 hours the sulphate content could be reduced to about 0.020 without reducing the acetyl content much below 61%.

*Example 4*

100 parts of cotton were pretreated with a mixture of 50 parts of acetic acid and 10 parts of formic acid, and the pretreated cotton was added to a mixture, previously cooled to 5° C., of 290 parts of acetic anhydride, 710 parts of acetic acid, 1 part of perchloric acid and 1 part of sulphuric acid. The acetylation lasted 2½ hours and the peak temperature was 35° C. Excess acetic anhydride was destroyed by adding water in the form of 50% aqueous acetic acid and, after adding an additional 20 parts of 50% acetic acid, the mixture was allowed to stand for 1 hour at 50° C. The product was a cellulose "triacetate" of acetyl value above 62% with a sulphate content of 0.023%. In a modification of this example, after the solution had stood for 1 hour at 50° C. as described, it was neutralized with magnesium acetate and heated to 80° C. for a further 30 minutes, with the result that the clarity and heat test of the cellulose acetate were somewhat raised, though the acetyl value remained substantially the same.

*Example 5*

100 parts of cotton were pretreated with a mixture of 50 parts of acetic acid and 10 parts of formic acid, and the pretreated cotton was added to a cooled mixture of 300 parts of acetic anhydride, 750 parts of acetic acid, 2 parts of sulphuric acid and 1 part of perchloric acid. The acetylation required 2 hours and the peak temperature was 50° C. Excess acetic anhydride was destroyed by adding water, and a further 100 parts of water was added and the cellulose acetate ripened for 7 hours at 70°–75° C. The cellulose acetate was then precipitated, washed with water, and dried. It had an acetyl value of 55.4% and a sulphate content of .001%. Another product made in the same way but ripened at 95° C. for 2 hours had an acetyl value of 56.2% and a sulphate content too low to be detected.

In these last two examples the pretreatment could be carried out with 50 parts of acetic acid and 1 part of perchloric acid, the perchloric acid in the acetylation mixture then being omitted.

Having described our invention, what we desire to secure by Letters Patent is

1. A process for the manufacture of an acetone-soluble cellulose acetate having an acetyl value of at least 57%, calculaed as acetic acid, which comprises acetylating cellulose with acetic anhydride in the presence of a solvent for the cellulose triacetate formed, using as catalyst throughout the acetylation 0.8 to 10% of sulphuric acid and 0.2 to 2% of perchloric acid, calculated on the weight of the cellulose, and hydrolyzing the cellulose triacetate in the acetylation solution until the cellulose acetate is soluble in acetone and has an acetyl value at least 57%.

2. A process for the manufacture of an acetone-soluble cellulose acetate having an acetyl value of at least 57%, calculated as acetic acid, which comprises acetylating cellulose with acetic anhydride in the presence of a solvent for the cellulose triacetate formed, using as catalyst throughout the acetylation 0.8 to 6% of sulphuric acid and 0.5 to 1.5% of perchloric acid, calculated on the weight of the cellulose, and hydrolyzing the cellulose triacetate in the acetylation solution until the cellulose acetate is soluble in acetone and has an acetyl value at least 57%.

3. A process for the manufacture of an acetone-soluble cellulose acetate having an acetyl value of at least 57%, calculated as acetic acid, which comprises activating cellulose by pretreatment with glacial acetic acid, acetylating the pretreated cellulose with acetic anhydride in the presence of glacial acetic acid as solvent for the cellulose triacetate formed, using as catalyst throughout the acetylation 0.8 to 6% of sulphuric acid and 0.5 to 1.5% of perchloric acid, calculated on the weight of the cellulose, and hydrolyzing the cellulose triacetate in the acetylation solution until the cellulose acetate is soluble in acetone and has an acetyl value of at least 57%.

4. A process for the manufacture of an acetone-soluble cellulose acetate having an acetyl value of at least 57%, calculated as acetic acid, which comprises activating cellulose by pretreatment with glacial acetic acid containing 0.2 to 1.5% of perchloric acid, calculated on the weight of the cellulose, acetylating the pretreated cellulose with acetic anhydride in the presence of glacial acetic acid as solvent for the cellulose triacetate formed, using as catalyst throughout the acetylation 0.8 to 6% of sulphuric acid and 0.5 to 1.5% of perchloric acid, calculated on the weight of the cellulose, and hydrolyzing the cellulose triacetate in the acetylation solution until the cellulose acetate is soluble in acetone and has an acetyl value of at least 57%.

5. A process for the manufacture of an acetone-soluble cellulose acetate having an acetyl value of at least 57%, calculated as acetic acid, which comprises acetylating cellulose with acetic anhydride in the presence of a solvent for the cellulose triacetate formed, using as catalyst throughout the acetylation 0.8 to 10% of sulphuric acid and 0.2 to 2% of perchloric acid, calculated on the weight of the cellulose, and hydrolyzing the cellulose triacetate in the acetylation solution in the presence of 2 to 6% of sulphuric acid to an acetyl value of 57 to 58.5%.

6. A process for the manufacture of an acetone-soluble cellulose acetate having an acetyl value of at least 57%, calculated as acetic acid, which comprises activating cellulose by pretreatment with glacial acetic acid containing 0.2 to 1.5% of perchloric acid, calculated on the weight of the cellulose, acetylating the pretreated cellulose with acetic anhydride in the presence of glacial acetic acid as solvent for the cellulose triacetate formed, using as catalayst throughout the acetylation 0.8 to 6% of sulphuric acid and 0.5 to 1.5% of perchloric acid, calculated on the weight of the cellulose, and hydrolyzing the cellulose triacetate in the acetylation solution in the presence of 2 to 6% of sulphuric acid to an acetyl value of 57 to 58.5%.

JOHN FRANCIS NEILSON.
JOHN ARTHUR HAWKES.

REFERENCES CITED

The following references are of record in the file of this patent:

UNITED STATES PATENTS

| Number | Name | Date |
|---|---|---|
| 2,175,842 | Koetschet | Oct. 10, 1939 |
| 2,265,528 | Hofmann et al. | Dec. 9, 1941 |